United States Patent [19]

Fritsche

[11] Patent Number: 5,793,761
[45] Date of Patent: Aug. 11, 1998

[54] COMMUNICATION SWITCHING SYSTEM HAVING A USER FACILITY SYSTEM AND A BASE SWITCHING SYSTEM

[75] Inventor: Norbert Fritsche, Munich, Germany

[73] Assignee: Siemens Aktiengesellschaft, Munich, Germany

[21] Appl. No.: 780,533

[22] Filed: Jan. 8, 1997

Related U.S. Application Data

[63] Continuation of Ser. No. 509,985, Aug. 1, 1995, abandoned.

[30] Foreign Application Priority Data

Aug. 1, 1994 [DE] Germany .................. 44 27 210.3

[51] Int. Cl.$^6$ ................................. H04L 12/50
[52] U.S. Cl. .................. 370/377; 370/410; 370/421
[58] Field of Search .................. 370/250, 360, 370/377, 400, 401, 410, 419, 421, 522

[56] References Cited

U.S. PATENT DOCUMENTS

| | | | |
|---|---|---|---|
| 5,175,728 | 12/1992 | Caplan et al. | 370/377 |
| 5,506,988 | 4/1996 | Weber et al. | 370/360 |

OTHER PUBLICATIONS

CCITT-COMXI-RAPP-R212E.DOC: New Recommendation Q.1214, Distributed Functional Plane for Intelligent Network CS-1, COM XI-R212-E, pp. 7-69, enclosure pp. 7-9.
James Martin, Design of Real-Time Computer-Systems, Prentice-Hall, Inc., Englewood Cliffs, N.Y., 1067, pp. 136-145.

*Primary Examiner*—Benedict V. Safourek
*Attorney, Agent, or Firm*—Hill & Simpson

[57] ABSTRACT

Communication system (KS) having a user facility system (LMS) for the realization of user facilities and having a switching system (VS) for setting up and clearing down connections between connected subscriber terminal equipment (TE) and for reporting switching-oriented events as well as user facility activation and user facility deactivation requests to the user facility system (LMS). The user facility system (LMS) has a plurality of user facility modules (LMB) and a user facility executive sequencer (LMAS) communicating therewith. The user facility modules (LMB) can call user facility development modules made available by the user facility executive sequencer (LMAS). Messages from the user facility executive sequencer (LMAS) about switching-oriented events occurring in the switching system (VS), is a facility activation and user facility deactivation messages as well as data input by subscriber terminal equipment (TE) are respectively communicated to a specific user facility module (LMB). Signaling messages for the subscriber terminal equipment (TE) are communicated from the user facility modules (LMB) to the switching system (VS). Dependent on an activation request, the user facility executive sequencer (LMAS) communicates an activation message to the specific user facility module (LMB) allocated to the activation request. Each user facility module (LMB) has a plurality of sub-controllers (R1, R2, R3) respectively controlling a message-dependent sub-execution, at least one coordination controller (RSC) forwarding messages coming from the user facility executive sequencer (LMAS) to the allocated sub-controllers (R1, R2, R3), and a call controller (ARS) for the calling of a coordination controller (RSC) dependent on an activation message.

20 Claims, 5 Drawing Sheets

5,793,761

COMMUNICATION SWITCHING SYSTEM HAVING A USER FACILITY SYSTEM AND A BASE SWITCHING SYSTEM

This is a continuation of application Ser. No. 08/509,985 filed Aug. 1, 1995, abandoned.

BACKGROUND OF THE INVENTION

The present invention is directed to a communication switching system. In particular, it is directed to a switching system composed of a user facility system and of a base switching system.

Current switching systems support a multitude of user facilities. These are auxiliary telecommunication services such as, for example, call redirection, conference calls, consultation, hold, etc. User facilities are realized in processor-controlled switching systems within the switching control executions. These switching control executions, also refer to as switching software, contain the call control as well as the user facilities. The user facilities are thereby interwoven with the call control as well as with one another. This leads to a high software complexity, as a result of which the software structure becomes unflexible with respect to the introduction of newer user facilities. In order to shorten the long introduction times for new user facilities caused as a result thereof, it has been considered to realize the parts of the control executions, that were previously dependent on one another, separately from one another in independent modules, each of which comprises a fixed interface toward the outside. Initial steps for separating the user facility control from the switching control have been pursued within the framework of the standardization procedures concerned with intelligent networks, "intelligent network" at ITU-T SG 11. With respect thereto, see the guidelines of the CCITT, "new recommendation Q.1214, distributed functional plane for intelligent network CS-1, COM XI-R212-E, pp. 7–69 as well as system pages 7–9.

A cleanly structured switching architecture arises by decoupling the user facility control from the switching control which is thereby reduced to its basic functionality. This is extremely modularly constructed and allows the fast introduction of new user facilities. Moreover, the separation of the user facilities enables a development independent of the user facilities and the call control.

Such a structure divides a switching system or, respectively, the switching software into a basic switching system and into a user facility system. The main component parts of a basic switching system are a call controller, a data base and a multitude of user facility control modules. The call controller is reduced to its fundamental jobs, the setup and cleardown of connections or, respectively, calls, and is therefore referred to as basic call controller. The user facility control modules thereby form a set of functions via which the call objects of call, subscriber and connection can be accessed, that is, via which calls can be manipulated.

The user facilities themselves are contained in the user facility system that communicates with the basic switching system via protocol.

The basic call controller of the basic switching system has the job of implementing the setup and cleardown of calls or, respectively, of their appertaining connections according to subscriber requests. In the course of its normal execution, consequently, it handles a two-party call. Over and above this, mechanisms are provided for reporting specific events to the user facility controller. The basic switching system can control a call between two subscribers without influence of the user facility system, that is, it is autonomous with respect to the setup and cleardown of two-party calls. A two-party call exists between two communication terminal equipment respectively allocated to subscriber line units with a respective connection that sets up the reference between a communication terminal equipment and the call. A respective status automaton is allocated to each connection as the status automaton of the connection. The connections are linked to one another via the call. Specific transitions occur between the statuses of the status automatons. They are triggered on the basis of external events. Such events are subscriber/network messages or internal messages, namely messages between the connections of a call.

SUMMARY OF THE INVENTION

It is an object of the present invention to provide a communication switching system composed of user facility system and of a basic switching system of the aforementioned species that enables a simple addition, removal and modification of user facilities within the user facility system.

This object is achieved by a communication switching system having a user facility system for the realization of user facilities and having a switching system for setting up and clearing down connections between connected subscriber terminal equipment and for reporting switching-oriented events as well as user facility activation and user facility deactivation requests to the user facility system. The user facility system has a plurality of user facility modules and has a user facility executive sequencer communicating therewith. The user facility modules can call user facility development modules made available by the user facility executive sequencer. Messages from the user facility executive sequencer about switching-oriented events occurring in the switching system is a facility activation and user facility deactivation messages as well as data input by subscriber terminal equipment are respectively communicated to a specific user facility module. Signaling messages for the subscriber terminal equipment are communicated from the user facility modules to the switching system. The user facility executive sequencer, dependent on the user facility activation request, communicates a user facility activation message to the specific user facility module allocated to the activation request. Each user facility module has: a plurality of sub-controllers respectively controlling a message-dependent sub-execution; at least one coordination controller that receives messages from the user facility executive sequencer and that forwards these messages to the sub-controllers respectively allocated to these messages; and a call controller for calling a coordination controller dependent on an incoming user facility activation message.

Advantageous developments of the present invention are as follows.

Acquisition of respectively required sub-controllers by the coordination controller is provided. The user facility system is structured such that, dependent on an arriving user facility activation message, the acquisition of a coordination controller by the call controller is provided.

The user facility executive sequencer is informed by the user facility modules about the presence of these user facility modules upon indication of an address information. The user facility system is structured such that the information about the presence of a user facility module is respectively communicated from the call controller thereof to the user facility executive sequencer.

The user facility system is structured such that the coordination controller, after being called by the call controller upon indication of an address information, communicates a message about the accomplished call to the user facility executive sequencer.

By allocation of a plurality of dependent sub-user facilities to a user facility and by a structuring of the user facility system, the coordination controller, after a call by the call controller, communicates the callability of these sub-user facilities to the user facility executive sequencer upon specification of the address of this coordination controller.

The user facility system is structured such that the user facility executive sequencer, dependent on a user facility deactivation request, communicates a user facility deactivation message to the specific user facility modules allocated to the deactivation request. At least one user facility modules has a deactivation selection controller that, dependent on an incoming user facility deactivation message, determines the coordination controller that is affected by this user facility deactivation message and that is to be addressed. The user facility system is structured such that the deactivation selection controller, upon arrival of a deactivation message, interrogates the parameters required for specifying the coordination controller to be deactivated and, dependent on these parameters, determines the addresses of the coordination controller to be selected. The user facility system is structured such that the deactivation selection controller interrogates these parameters from the components initiating the deactivation call.

The user facility executive sequencer, in addition to having the user facility development modules, has a message distributor in order to communicate the messages incoming from the switching system about the switching-oriented events occurring in the switching system as well as user facility activation and user facility deactivation messages to the user facility modules.

The user facility executive sequencer has a user facility correlation controller in order the check the allowability of user facility activation and user facility calls upon activation and call. At every incoming event message, the user facility correlation controller determines the user facility modules or modules to which this event message is to be delivered.

The user facility executive sequencer has a central data base with event tables for activated as well as called user facility modules, user facility activation data and user facility module addresses and coordination controller addresses to be addressed by the user facility executive sequencer.

In the inventive communication switching system, the user facility system is composed of a plurality of user facility modules and of a user facility executive sequencer communicating therewith. A modification of the user facilities by adding, removing or modifying individual user facility modules is thereby enabled.

The user facility modules can call user facility development components that are made available by the user facility executive sequencer. Messages about switching-oriented events, user facility activation and user facility deactivation messages as well as data input by subscriber terminal equipment are respectively communicated from the user facility executive sequencer to a specific user facility module. Signaling messages, acknowledge messages, data requests as well as data outputs (for example, display data) for the subscriber terminal equipment are communicated to the basic switching system from the user facility modules.

A basic switching system to be employed in the inventive system is constructed, for example, such that both the basic call controller as well as the user facility control modules can access the same data base within the basic switching system. Among the things thereby enabled is that information elements of the call objects that are employed by the basic call controller for handling a call and that are read from the data base for this purpose can be manipulated by the user facility system using specifically allocated user facility control modules before being handled by the basic call controller.

The control execution of the basic call controller is thereby divided into processing modules that are clearly allocated to individual messages. Messages in this sense are both internal messages between the connections as well as subscriber/network messages between the subscriber line units and the basic call controller. As a result thereof, the handling of call objects influenced in the data base can be initiated upon employment of the processing modules of the control sequence of the basic call controller by initiating the output of a respectively acquired message. That is, the user facility system can manipulate specific information elements (according to the requirements of the corresponding user facility) of specific call objects of a call in the database as needed using a respectively allocated function, namely the corresponding user facility control module of the basic switching system. Following thereupon, the user facility system can initiate the delivery of a message to the status automaton of the affected connection in the basic call controller, potentially also with the assistance of a user facility control module defined for the corresponding purpose. This message then leads to a handling of the influenced call objects by the basic call controller of the basic switching system. In this case, the basic call controller can evaluate such a message as a standard, internal message and need not distinguish whether this internal message has been initiated by the status automaton of a connection that usually outputs such a message or by the user facility system. User facility control modules, for example, are thus access mechanisms to call objects. After an interruption in execution, these access mechanisms can also enable a reinstitution of the control execution of the basic call controller initiated by the user facility system.

In a beneficial embodiment of the basic call controller, individual processing modules of the control sequence of the basic call controller are structured such that, following an interruption of the processing module execution at an event generation point, the user facility system can initiate a continuation of the sequence at the location of the corresponding event generation point. In this case, such processing modules are in turn divided into corresponding sub-modules that provide corresponding status entry points in the area of said event generation points, namely in the region of status transitions. The event generation points are thereby provided in the processing modules of the basic call controller and can be activated as needed, usually by corresponding user facilities or by the user facility system. When an event generation point is activated, then (when the control sequence reaches this event generation point) a message about the status that has been reached or, respectively, the requirement of a reply as anticipated event is transmitted to the user facility system. The control execution can only be continued in this case after receiving the required reply.

For achieving the aforementioned object, in particular, the user facility system is fashioned such that the user facility executive sequencer communicates a user facility activation message to the specific user facility module dependent on a user facility activation request, this specific user facility module being allocated to the user facility addressed by this activation request.

Each user facility module contains a plurality of sub-controllers, at least one coordination controller and a call controller. Each sub-controller thereby respectively controls a message-dependent sub-execution. The coordination controllers receive respective messages from the user facility executive sequencer and forward these messages to the sub-controllers respectively allocated to these messages. A call controller respectively serves for the calling of a coordination controller dependent on an incoming user facility activation message.

In a communication system of the invention, therefore, a modification such as, for example, addison or modification of user facilities is limited to a modification of the allocated sub-controller. The control software of the sub-controllers that is respectively required is simplified for the individual user facilities. The control software for the execution of the functions of the call controller and of the coordination controller is respectively rendered uniform to a far-reaching extent.

When, in embodiments of inventive systems, a coordination controller instances respectively required sub-controllers and, potentially, a call controller also respectively instances required coordination controllers, the user facility system is simplified further since a multiple, parallel processing of the same user facility control execution is enabled without a static occupation of a storage medium with permanently provided instances of the multiply required executions being required. The need for memory location can thereby be reduced.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
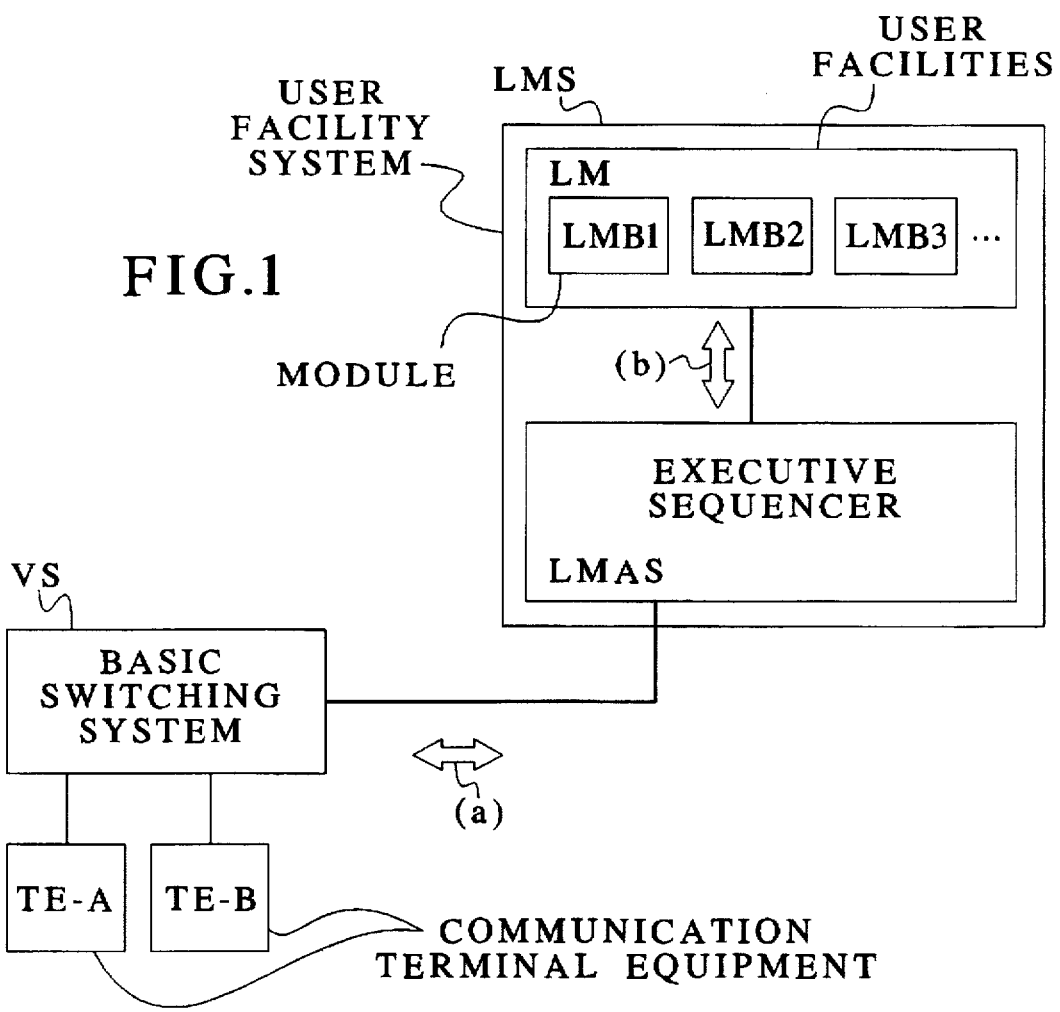
FIG. 1 is a block circuit diagram of the structure of a communication system having an inventive fashioning of the user facility system.

FIG. 1 shows the structure of a communication system composed of a basic switching system VS (called switching system VS below) that communicates via a protocol (a) with a user facility system LMS and that is connected to communication terminal equipment TE-A and TE-B via a subscriber/network interface (not shown) and via respective subscriber line units.

The user facility system LMS is composed of a user facility executive sequencer LMAS and of the user facilities LM that are each respectively composed of a user facility module LMB1, LMB2 or LMB3. For the control of user facilities LM, the user facility system LMS communicates (a) with the switching system VS that reports switching-oriented events such as, for example, changes in call status, status of terminal equipment, etc., to the user facility system LMS and makes functions that can be called by the user facility system LMS available, these being capable of influencing the call processing such that the desired user facility control execution can be achieved. The user facility executive sequencer LMAS communicates (b) with the user facility modules LMB1, LMB2, LMB3. The user facility executive sequencer LMAS contains user facility development modules LMEB (see FIG. 9) for developing the user facilities LM. These user facility development modules LMEB can be called by the user facility modules LMB1, LMB2, LMB3. The user facility executive sequencer LMAS communicates messages about events communicated by the switching controller VS as well as the user facility signaling such as, for example, activation messages, messages for deactivation of user facilities at messages about the data input and data output between user facility and subscriber terminal equipment TE-A, TE-B to the user facility modules LMB1, LMB2, LMB3. The events of the switching controller VS are thereby interpreted within the user facility executive sequencer LMAS in order to be able to decide to which event the user facility is delivered. This procedure preferably includes the compatibility check between the currently active user facility and user facilities to be potentially activated in order to avoid potentially occurring conflicts.

Figure 2:
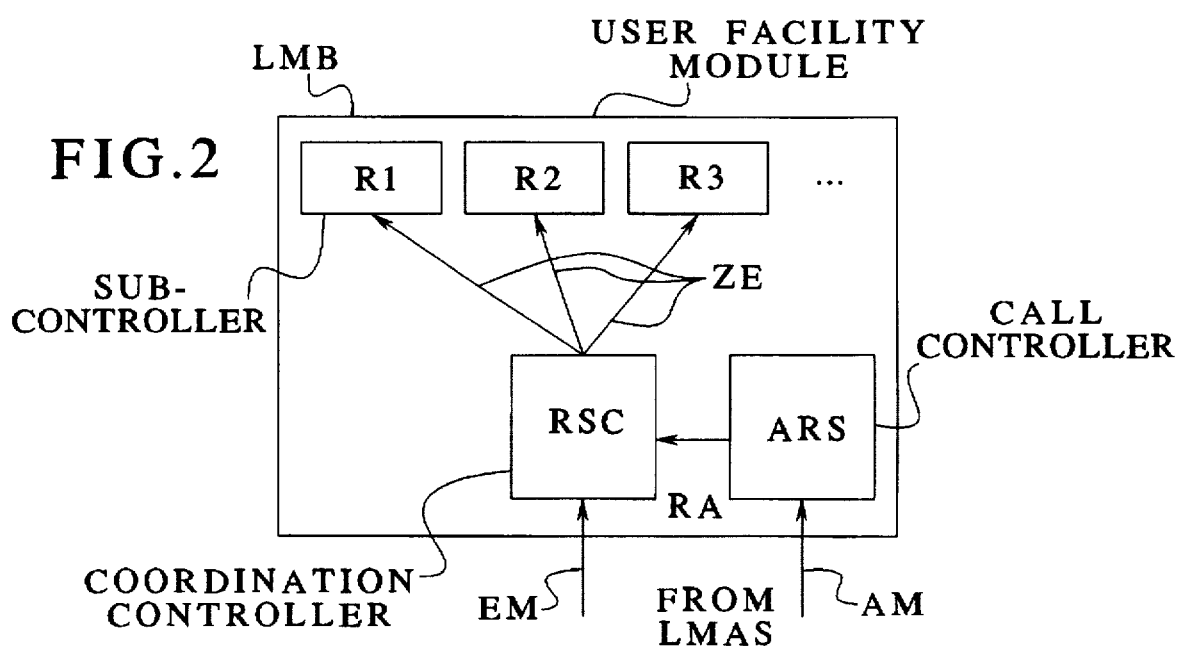
FIG. 2 is a block circuit diagram of the structure of a user facility module LMB, LMB1, LMB2, LMB3 of FIG. 1.

User facility modules LMB, LMB1, LMB2, LMB3 are allocated to the individual user facilities. FIG. 2 shows the structural format of one of the user facility modules LMB1, LMB2, LMB3 provided in the user facility system LMS of FIG. 1. The illustrated user facility module LMB contains a call controller ARS, a coordination controller RSC as well as sub-controllers R1, R2, R3.

A user facility module LMB offers control executions that can be requested, that is, that can be activated or, respectively, called such as, for example, call redirection. Sub-user facilities can be provided within the user facility LM, their call-in being linked to the existence of the call or, respectively, of the activation of the higher-ranking user facility LM. An example of a sub-user facility is the output of all abbreviated dialing destinations that have been programmed in or the addison of a new abbreviated dialing destination. These two sub-user facility calls are dependent on the prior activation of the user facility "abbreviated dialing", that is, can only be addressed after activation of this user facility.

Figure 8:
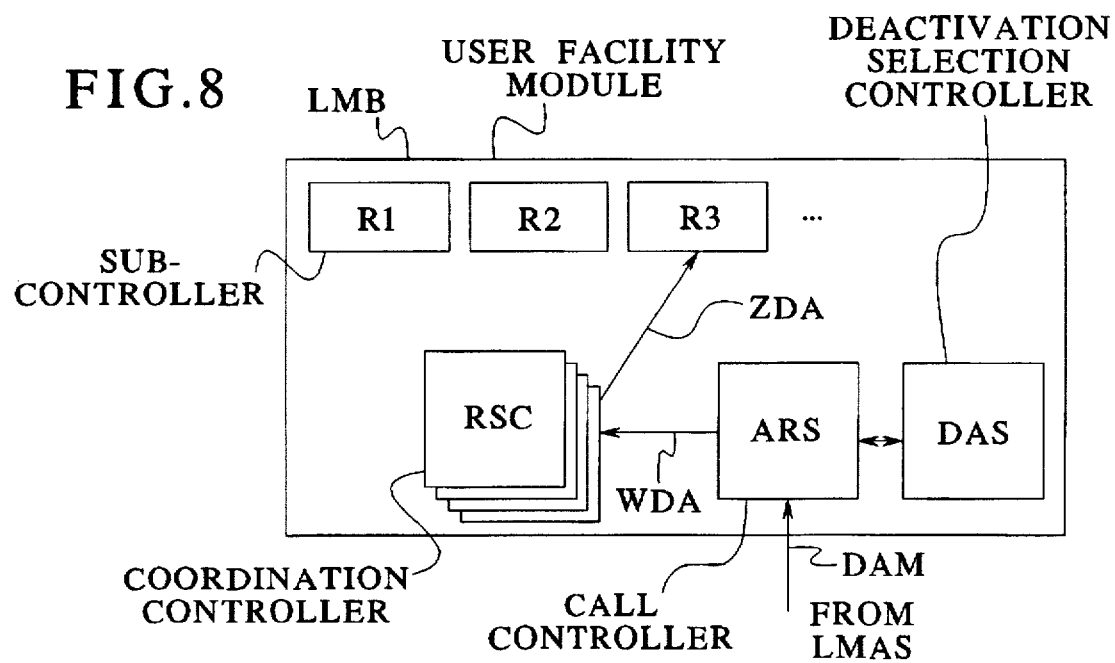

A user facility module LMB is composed of a call controller ARS, of one or more coordination controllers RSC and of a plurality of sub-controllers R1, R2, R3. At least three sub-controllers, namely FReq for the activation of the user facility, FCanc for the deactivation of the user facility as well as a sub-controller for an event, for example, are thereby normally required. A user facility module LMB can also potentially contain a deactivation selection controller DAS (FIG. 8). On the other hand, a sub-controller for the deactivation can potentially be foregone given specific applications.

The configuration data of a user facility module LMB contain a user facility indicator of the user facility LM made available as well as an allocation for messages onto the sub-controllers R1, R2, R3. For example, the indicator for a user facility LM can be SD (abbreviation for the English-language term "speed dialing") for "abbreviated dialing". Examples of indicators for sub-user facilities are AddSD: "add SD destination" and SDData: "display SD destinations".

The sub-controller to be addressed can, for example, be determined by specifying an indicator, being determined on the basis of the information about the allocation of the messages onto the sub-controllers R1, R2, R3 contained in the configuration data of the user facility module LMB when, within the framework of a user facility controller, the same message deriving from different senders is to be processed by different sub-controllers. An example of this in the user facility "conference circuit" is the "hang-up" of the conference master or of a conference participant.

A configuration data file for the user facility "speed dialing" having the user facility indicator SD is listed below in conjunction with the sub-user facility "add SD destination"—user facility indicator AddSD—, whereby the event E1 leads to a translation of call numbers:

| Message | LM_ID | R_VAR | R_No |
|---------|-------|---------|------|
| FReq | SD | | 1 |
| FCanc | SD | Default | 2 |
| E1 | | Default | 3 |
| SubFReq | AddSD | | 4 |

LM_ID thereby stands for the user facility indicator, R_Var corresponds to an indicator for the identification of the terminal equipment participating in the user facility activation, and R_No is an identification for the sub-controller R1, R2, R3 to be selected.

The call controller ARS of a user facility module LMB reads the configuration data of the user facility LM. It reports the user facility to the user facility executive sequencer LMAS in that it informs the latter of a user facility name as well as of the address of the call controller ARS. The call controller ARS receives activation messages FReq from the user facility executive sequencer LMAS. Thereafter, it calls a coordination controller RSC contained in the user facility module LMB, instances this coordination controller RSC dependent on the form of realization of the user facility modules and thereby crates a new user facility instance that is represented by the RSC call.

The coordination controller RSC enters the configuration data. Further, it announces the user facility instance allocated to it and, potentially, sub-user facilities to the user facility executive sequencer LMAS. The coordination controller RSC represents the user facility instance and thus provides this with a specific, unambiguous identifier, for example on the basis of the address of the coordination controller RSC. It is the recipient of all event messages that are delivered to the corresponding user facility call. The coordination controller RSC distributes these messages dependent on configuration data and on an indicator R_Var for a communication terminal equipment. When a plurality of sub-controllers R1, R2, R3 are allocated to the same event, these can be distinguished on the basis of this indicator R_Var. These indicators R_Var are respectively deposited in a database DB of the user facility executive sequencer LMAS as activation parameters upon activation of a user facility LM. The coordination controller RSC calls the sub-controllers R1, R2, R3 of the user facility module LMB, LMB1, LMB2 or LMB3 required for the implementation of a user facility and instances this corresponding sub-controller. The coordination controller RSC sequentializes the call of the sub-controllers R1, R2, R3. The sub-controllers R1, R2, R3 tell it when they are ended. This can be required in order to assure that a plurality of sub-controllers do not simultaneously influence the same call. Given an activated sub-controller R1, R2, R3, arriving messages are buffered in the coordination controller RSC. A coordination controller RSC respectively exists for the duration of a user facility call or, respectively, of a user facility activation and receives all event messages that are allocated to this user facility call by the user facility executive sequencer LMAS.

The control execution of a user facility LM is described by a plurality of sub-control executions R1, R2, R3. These sub-control executions R1, R2, R3 are selected on the basis of the arriving messages. Each sub-controller R1, R2, R3 processes a precisely defined sub-control execution of the user facility LM.

Sub-controllers R1, R2, R3 are subdivided according to the following principle dependent on corresponding messages:

Activation messages for user facilities LM and potentially allocated sub-user facilities;

Deactivation messages;

Event messages of the switching controller VS, namely status event messages as well as messages of events that, on the initiative of the user facility system LMS, are generated by status transitions of the connections by the switching system VS; and Timer information of the user facility development modules LMEB.

Acknowledge messages of user facilities LM that follow the user facility development module calls are received within the sub-controllers R1, R2, R3 and consequently do not lead to a further sub-division. All actions that should ensue upon arrival of a message allocated to the respective sub-controller are executed within the sub-controllers R1, R2, R3. These are both user facility development module calls as well as control structures such as comparisons, branches, etc. As soon as the processing of new messages of this type is required, a new sub-controller must be compiled.

Figure 9:
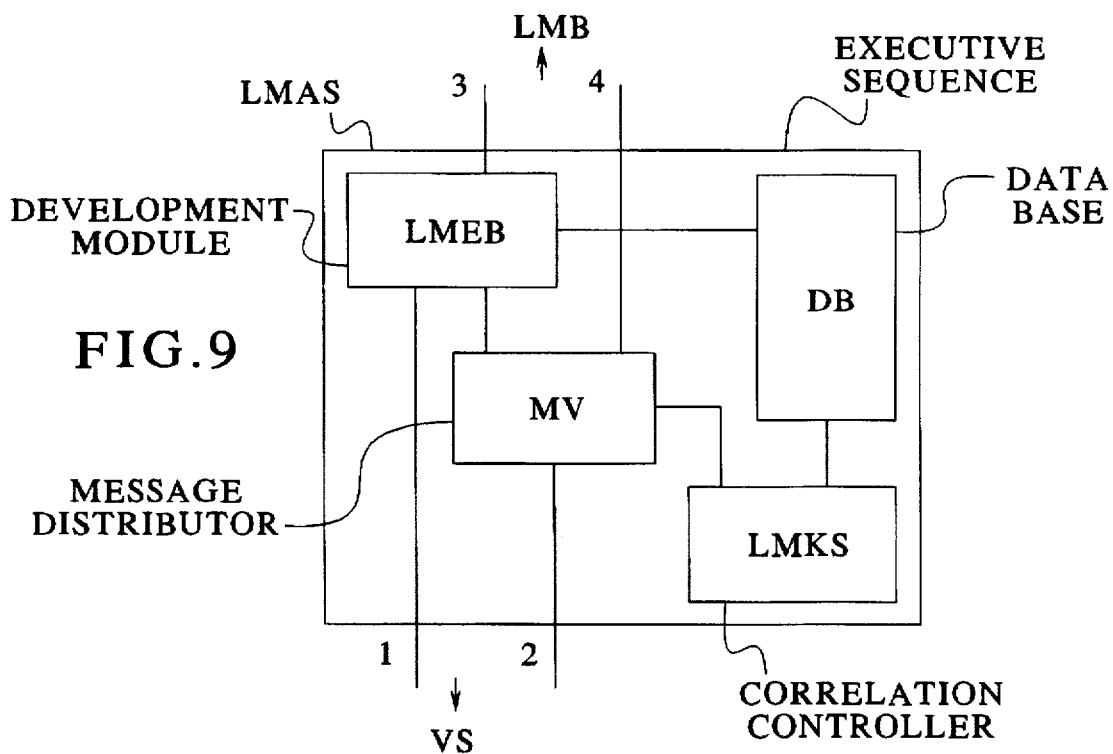
FIG. 9 depicts the structure of an embodiment of the user facility executive sequencer LMAS of FIG. 1.

In order to resolve correlations between different user facilities LM, the data for activation and call of user facilities LM are required in the user facility executive sequencer LMAS and are therefore deposited in the data base DB. The user facility modules LMB, LMB1, LMB2 or LMB3 also require these data. The user facility modules LMB, LMB1, LMB2, LMB3 of the exemplary embodiment, however, preferably do not have their own data base DB. The sub-controllers R1, R2, R3 therefore note data that are important for the further execution of a user facility control execution in the data base DB of the user facility executive sequencer LMAS (FIG. 9). The addressing thereby ensues via the identifier of the responding coordination controller RSC in an unambiguous way. After the processed sub-controller R1, R2, or R3, all local data of the sub-controllers R1, R2, R3 are lost with the exception of the data specifically deposited in the data base DB of the user facility executive sequencer LMAS.

An example of the subdivision of a user facility control execution into sub-controllers R1–R6 while indicating the sub-controllers as well as the allocated messages and the most important control activities is presented below with reference to the user facility of "call redirection according to time":

R1 FReq=user facility activation message processing the activation (FReq)

collect redirection destination from subscriber set event generation point "redirection source rings" in the switching system VS store activation parameters in the data base DB of the user facility executive sequencer LMAS R2 FCanc=user facility deactivation message processing of the deactivation (FCanc)
erase event generation point of the switching system VS
erase activation parameters
R3 Event: "redirection source rings"
set timer
event generation points: "redirection source answers", "caller hangs up" in the switching system VS
R4 timer runs down
redirect call
erase event generation points in the switching system VS
R5 redirection source picks telephone up within timer interval
erase timer
erase event generation point in the switching system VS
continue call processing of the switching system VS in normal fashion
R6 caller hangs up within the timer interval
erase timer
erase event generation points
continue call processing of the switching system VS in normal fashion.

Figure 10:
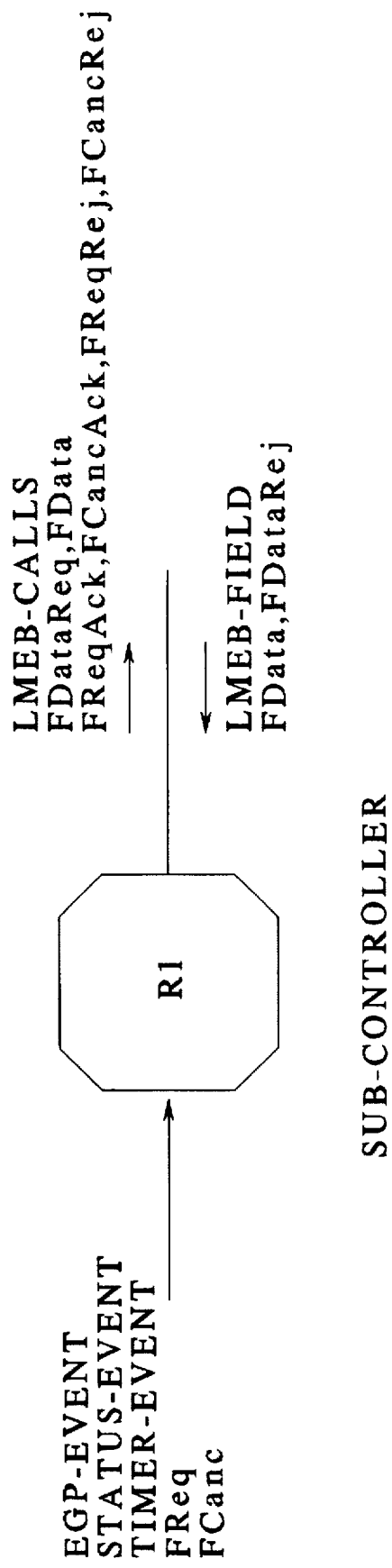
FIG. 10 depicts the SDL process of a sub-controller of FIGS. 2–8.

As may be seen from FIG. 10, a sub-controller R1, R2, R3 in SDL corresponds to exactly one SDL process. The process, including the signals processed or, respectively, generated by it are shown in FIG. 10. The messages of the user facility signaling thereby respectively begin with F (from the English expression "feature"). Accordingly, a sub-controller R1 receives messages "FReq", "FCanc", that relate to the activation or, respectively, deactivation, as well as messages "EGP event", "status event", "timer event" about event generation point events, status events and timer events from the user facility executive sequencer LMAS. The sub-controller R1 outputs calls "LMEB calls" for user facility development modules LMEB to the user facility executive sequencer LMAS, as well as messages "FDataReq", "FData", "FReqAck", "FCancAck", "FReqRej", "FCancRej" pertaining to data or, respectively, acknowledgements for calling data, for data output, for negative as well as for positive and negative acknowledge in response to activation and deactivation messages. The sub-controller R1 receives calls "LMEB calls", acknowledgment messages for processed user facility development modules LMEB as well as messages "FDeta" pertaining to data for inputting data from the user facility executive sequencer LMAS.

The following messages lead to a subdivision into different sub-controllers R1, R2, R3:

Messages about events of the switching system VS, namely event generation point events and status events;

User facility signaling of the switching system or of a subscriber terminal equipment TE-A, TE-B to the switching system VS that are forwarded transparently therefrom to the user facility system, namely activation messages FReq as well as deactivation messages FCanc;

Timer messages. The timers are made available within the user facility development modules LMEB.

The processing part of the sub-controllers R1, R2, R3 supplies the following input/output messages:

User facility development module calls and acknowledgments;

User facility signaling, namely acknowledgments for the activation or, respectively, deactivation FReqAck, FReqRej, FCancAck and FCandRej, as well as data input and data output from and to subscriber terminal equipment FDataReq, FData and FDataRej.

User facility activations are respectively related to a subscriber terminal equipment TE-A, TE-B. When a plurality of instances of the same user facility are activated for a subscriber terminal equipment TE-A, TE-B, then the user facility instance that is to be deactivated cannot be unambiguously identified on the basis of the deactivation messages FCanc since the deactivation message FCanc, in addition to containing the user facility indicator LM_ID, only contains an identifier of the subscriber terminal equipment TE-A, TE-B as well as data about the calls of the subscriber terminal equipment TE-A, TE-B. In such instances, a deactivation selection controller DAS can preferably be provided in order to select a coordination controller RSC to be ended. The required data are requested from the affected subscriber terminal equipment TE-A, TE-B by the deactivation selection controller DAS in order to subsequently define the address of the coordination controller RSC belonging to the activation.

The control executions of a user facility module LMB, LMB1, LMB2, LMB3 shall be set forth below with reference to FIGS. 2–8. The call controller ARS receives the activation message AM allocated to it by the user facility executive sequencer LMAS. The user facility indicator is checked on the basis of the configuration data. Following thereupon, a new instance of the coordination controller RSC is generated (RA1 in FIG. 4). This coordination controller RSC is provided with the activation message RA or, respectively, RA1. The coordination controller RSC reports and additionally reports sub-user facilities potentially under its address to the user facility executive sequencer LMAS (LMIID, LMSUBID, in FIG. 6 or, respectively, FIG. 7). Thereafter, a memory area for this user facility instance is established in the database DB of the user facility executive sequencer LMAS. On the basis of the configuration data, the coordination controller RSC determines the sub-controller R1, R2 or R3 that is responsible for the activation message that has arrived and thereupon potentially instances this sub-controller R1, R2 or R3 to be called. The sub-controller R1, R2 or R3 to be called is given the activation message ZE (in FIG. 2) or, respectively, the instancing ZEI (in FIG. 3). The corresponding sub-controller R1, R2, R3 subsequently carries out its execution.

Figure 4:
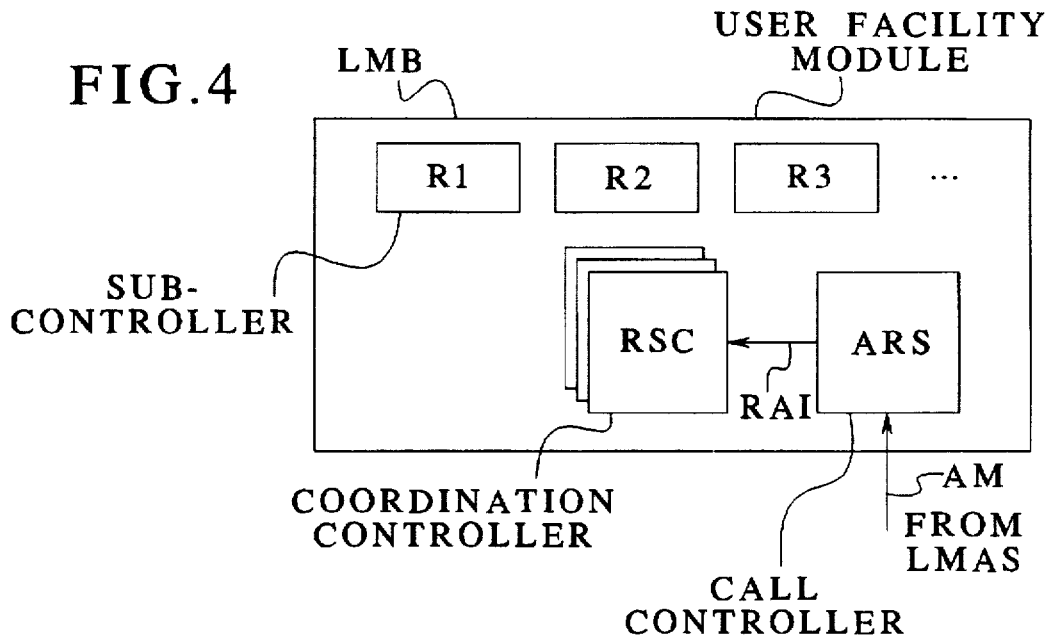

FIG. 2 shows an exemplary embodiment wherein, in response to an activation message AM, the call controller ARS calls a coordination controller RSC (RA). This is meaningful when only one instance of a coordination controller RSC is provided or when a separate coordination controller RSC is erected for each instance, this merely having to be called. A more beneficial solution with respect thereto is shown in FIG. 4 wherein the call controller ARS respectively calls and instances (RAI) a coordination controller RSC.

Figure 3:
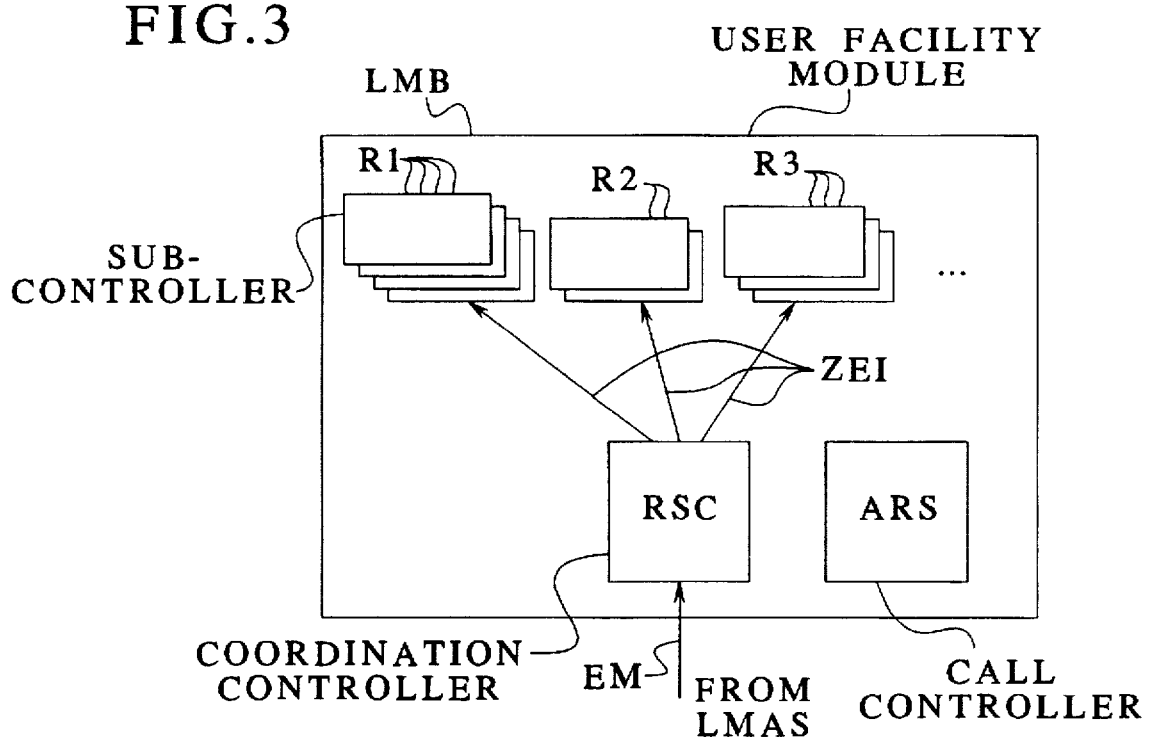
FIGS. 3–8 depict user facility modules LMB according to FIG. 2 in different statuses or, respectively, with special characteristics.

In the same way, FIG. 2 shows that the coordination controller RSC can respectively call a sub-controller R1, R2, R3 with a message ZE. Here, FIG. 3 shows the possibility that the coordination controller RSC of each sub-controller R1, R2, R3 can set up a plurality of instances as needed via the call ZE1.

Figure 5:
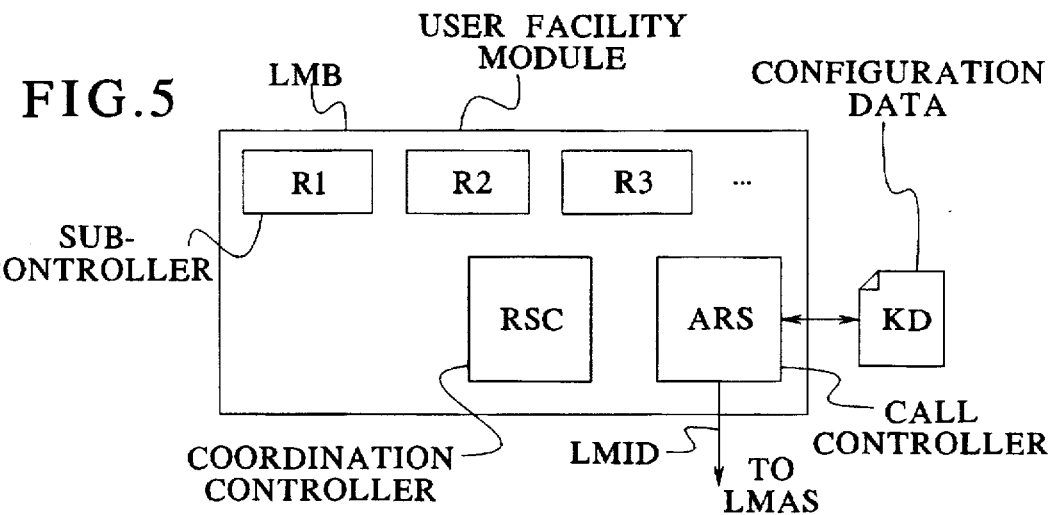

FIG. 5 shows a user facility module having sub-controllers R1, R2, R3, a coordination controller RSC and a call controller ARS. As shown in FIG. 5, the call controller ARS (for example upon initialization of the user facility system LMS) outputs configuration data KD about the respective user facility, namely the user facility identifier as well as the address of the call controller ARS to the user facility executive sequencer LMAS in a configuration message LMID of the user facility.

Figure 6:
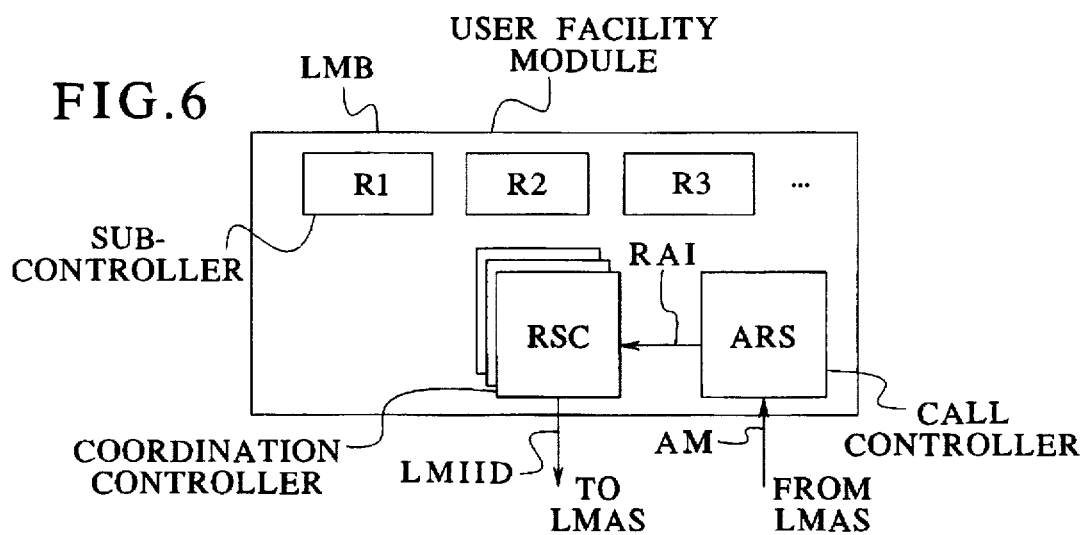

As may be seen from FIG. 6, an instanced coordination controller RSC—after arrival of an activation message AM from the user facility executive sequencer LMAS to the call controller ARS and according to the instancing and call information RAI of the call controller ARS to the coordination controller RSC—[. . . ] a message LMIIE having address information of the generated RSC instance to the user facility executive sequencer LMAS.

Figure 7:
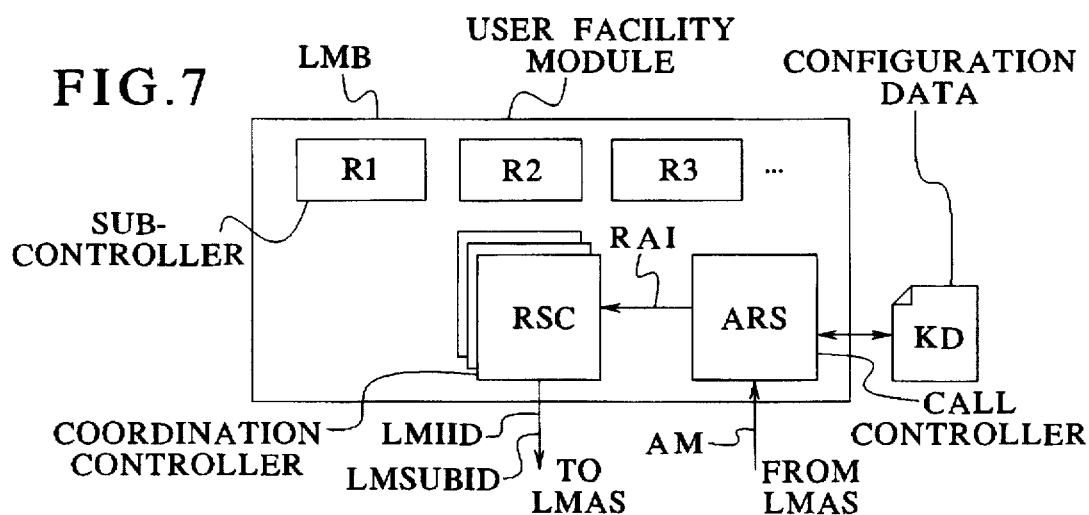

As may be seen from FIG. 7, which shows the same user facility module LMB as FIG. 6, the coordination controller RSC—in response to a message RAI from the call controller ARS for the activation and instancing of this coordination controller RSC—outputs both a message LMSUBID having address information of the user facility identifiers or, respectively, configuration data of sub-user facilities as well as a message RSCID having the address information of the generated RSC instance to the user facility executive sequencer LMAS.

When only one user facility activation of a user facility is present for a specific subscriber terminal equipment, then a deactivation message DAM (not shown in the FIGS.) is preferably delivered from the user facility executive sequencer LMAS directly to the called coordination controller RSC. When a user facility is multiply activated for a subscriber, that is, for example, a subscriber has activated a plurality of automatic call-backs, then the user facility executive sequencer LMAS delivers a deactivation message to the call controller ARS that in turn communicates this to the deactivation selection controller DAS (FIG. 8). In response thereto, the deactivation selection controller usually interrogates further data from the subscriber terminal equipment TE-A, TE-B that specify the user facility call to be deactivated in greater detail. Thereupon, the address of the appertaining coordination controller RSC is identified via the user facility development modules LMEB. Thereupon, the deactivation message DAM is forwarded in common with the corresponding RSC addresses to the call controller ARS that in turn forwards the message WDA to the correct coordination controller RSC. The correct coordination controller RSC then onwards the message ZDA to the correct sub-controller R1, R2, R3.

The principal jobs of the user facility executive sequencer LMAS shown in greater detail in FIG. 9 are the distribution of the messages (a) arriving from the switching controller to user facilities LM that are to be activated, called, have been called or, respectively, are to be deactivated, as well as the function of a function server for the user facility modules LMB, LMB1, LMB2, LMB3, that is, offering functions that can be called by the user facility modules LMB, LMB1, LMB2, LMB3 to the user facility development modules LMEB. Messages to be distributed by the user facility executive sequencer LMAS are thereby event messages that the user facility executive sequencer LMAS outputs to called user facilities LM, that is, to specific coordination controllers RSC, as well as the user facility signaling. Included in the user facility signaling are activation messages to the call controller ARS of the appertaining user facility module LMB, LMB1, LMB2, LMB3, the function of the data input and data output for communicating data between the individual sub-controllers R1, R2, R3 and the switching system VS. The data transmission between the sub-controllers R1 and the communication terminal equipment TE-A and TE-B via the switching system VS are thereby included. The output of a deactivation message to a user facility LM to be deactivated is also included among the user facility signaling. When the user facility to be deactivated can be unambiguously allocated to a subscriber terminal equipment TE-A, TE-B, then the deactivation message DAM is directly output to the appertaining coordination controller RSC. When the allocation of a deactivation message is not unambiguous, then the user facility executive sequencer LMAS outputs the corresponding deactivation message DAM to the call controller ARS that then forwards it to a deactivation selection controller DAS.

The user facility executive sequencer LMAS makes functions that can be called by user facilities LM available to the user facility development modules LMEB. Examples of such user facility development modules LMEB are the local access to the database DB of the user facility executive sequencer LMAS, the call of an exchange-side function for influencing the call controller, etc. Such calls are potentially forward to the switching system VS. Attaching a sender identifier is thereby beneficial in order to be able to unambiguously assign a received acknowledgment later.

The user facility executive sequencer LMAS of FIG. 9 contains a message distributor MV for distributing the event message and the user facility signaling that are sent by the switching system VS into the corresponding user facility modules, that is, onto the allocated call controllers ARS or, respectively, coordination controllers RSC within the user facility modules LMB, LMB1, LMB2, LMB3. The user facility executive sequencer LMAS also contains a user facility correlation controller LMKS in order to identify the recipient of a message to be delivered and in order to undertake the correlation of the user facilities LM, that is, to assure the coexistence of a plurality of user facility calls that could potentially influence one another, as well as to forbid requested user facilities LM that are incompatible with user facilities LM that have already been activated or called.

As already mentioned, the user facility executive sequencer also contains a data base DB. This data base DB contains event tables which reveal what user facility call that can be addressed via the address of the appertaining coordination controller RSC expects what events, activation data addressable via the address of the coordination controller RSC belonging to a user facility call, as well as address information like a user facility identifier in conjunction with the address of the corresponding call controller ARS as well as a sub-user facility identifier with the addresses of the appertaining coordination controller RSC.

The correlation controller LMKS accesses the database DB and, given event messages to be delivered, determines the addresses of the recipient coordination controller RSC on the basis of the event table in the database DB. This addresses of the coordination controller RSC was noted in the database DB when the user facility was called and indicates the recipient of the event message.

As already mentioned, a call controller ARS (upon initialization of the user facility system LMS) reports to the user facility executive sequencer LMAS with a user facility indicator of the corresponding user facility module LMB and with the address of the call controller ARS. Upon activation messages, the user facility coordination controller LMKS determines the address of the call controller ARS provided as recipient of the appertaining user facility module LMB, LMB1, LMB2, LMB3 on the basis of this indicator that is input at the terminal equipment of the activation request of the corresponding user facility LM. An example of such an indicator is CFU for the function "call forwarding unconditional".

As may be seen from FIG. 9, the message distributor MV forwards the user facility signaling via the illustrated line 2 in the direction of the switching controller VS. A sender identifier of the sending sub-controller R1, R2, R3 is thereby attached to the communicated signaling message in order to be able to assign answerbacks. Overall, event messages from the switching controller VS as well as the user facility signaling in both directions are communicated from and to the message distributor MV via the line 2. Moreover, the message distributor MV implements (after a respective inquiry at the user facility correlation controller LMKS) a distribution (4 in FIG. 9) of the switching control event EM (in FIGS. 2 and 3) to the user facility modules LMB, LMB1, LMB2, LMB3 as well as a distribution (4 in FIG. 9) of the user facility activation messages AM (in FIGS. 2, 4, 6 and 7) to the respectively allocated user facility LM. Overall, event messages allocated to specific user facilities LM or, respectively, to specific user facility instances are transmitted from and to the message distributor MV via the line 4 leading to the user facility modules LMB and the user facility signaling is also transmitted thereover in both directions. Call and acknowledgement of the user facility development modules LMEB are transmitted via the line 3 between the user facility modules LMB and the user facility development modules LMEB. Call and acknowledgment of the exchange-side functions for call influencing are communicated over the line 1 between the user facility development modules LMED and the switching system VS. The lines 1, 2, 3 and 4 are thereby only intellectual aids for more easily illustrating the communication relationships.

Possible sequences of the message distribution within the user facility executive sequencer LMAS for various types of message are set forth below.

Upon arrival of an activation message FReq for a user facility, the message distributor MV has the following function:

the activation message FReq arrives from the switching system VS;

this message is forwarded to the user facility correlation controller LMKS;

the user facility correlation controller LMKS accesses the data base DB in order to identify the address of the call controller ARS of the requested user facility LM;

the correlation controller LMKS evaluates the allowability of the request and, dependent thereon, returns the activation message with the addresses of the corresponding call controller ARS back to the message distributor MV;

the activation message is onwarded to the appertaining call controller ARS of the user facility module LMB, LMB1, LMB2, LMB3 of the requested user facility LM.

Upon arrival of an activation messages FReq for a sub-user facility, the message distributor MV has the following functioning:

the activation message FReq arrives from the switching system VS;

this message is forwarded to the user facility correlation controller LMKS;

the user facility correlation controller LMKS accesses the data base DB in order to determine the address of the coordination controller RSC of the requested sub-user facility, since activation messages for sub-user facilities are delivered to the coordination controller RSC of the corresponding user facility call;

the correlation controller LMKS evaluates the allowability of the request and, dependent thereon, returns the activation message with the address of the corresponding coordination controller RSC to the message distributor MV;

the activation message is onwarded to the appertaining coordination controller RSC of the user facility modules LMB, LMB1, LMB2, LMB3 of the requested user facility LM.

Upon arrival of a deactivation message FCanc for user facility LM, the message distributor MV has the following functioning:

the deactivation message FCanc arrives from the switching system VS;

this message is forwarded to the user facility correlation controller LMKS;

the user facility correlation controller LMKS accesses the data base in order to determine the address of the coordination controller RSC of the requested user facility LM; when a plurality of coordination controllers RSC exist for the present user facility LM with the present subscriber identifier, that is, when there is no unambiguous allocation to one coordination controller RSC, then the deactivation message is delivered to the allocated call controller ARS;

the correlation controller LMKS returns the activation message with the recipient address of the corresponding coordination controller RSC or, respectively, call controller ARS to the message distributor MV;

the activation message is onwarded to the appertaining coordination controller RSC or, respectively, call controller ARS of the user facility modules LMB, LMB1, LMB2, LMB3 of the user facility LM to be deactivated.

Upon arrival of a message for an event that has occurred in the switching system, the message distributor MV has the following functioning:

the event message arrives from the switching system VS;

this message is forwarded to the user facility correlation controller LMKS;

the user facility correlation controller LMKS accesses the data base in order to determine the address of individual instances, that is, of the individual coordination controllers RSC of the individual user facility modules LMB1, LMB2, LMB3 for which a corresponding event generation point has been set and in order to determine the indicator R_Var allocated to the communication terminal equipment TE-A, TE-B affected by the event message in the framework of the user facility control (with respect thereto, see the configuration data of the user facility modules LMB);

the correlation controller LMKS returns the event message with the address of the coordination controller RSC representing the appertaining instance to the message distributor MV;

an event message can thereby also be allocated to a plurality of respectively affected user facility modules LMB, LMB1, LMB2, LMB3 or, respectively, to a plurality of respectively affected instances of a user facility module LMB, LMB1, LMB2, LMB3, that is, can be allocated to a plurality of coordination controllers RSC; the coordination controller RSC determines the interested parties of the event message to whom this event is to be delivered dependent on the compatibility of the currently activated or, respectively, called user facilities;

the event message is onwarded to the ( ) determined coordination controllers RSC of the affected user facility calls of the user facility modules LMB, LMB1, LMB2, LMB3.

The call of user facility development modules LMEB within the user facility executive sequencer LMAS ensues in response to the transmission of a call message corresponding to the requested function of the user facility development modules LMEB from a user facility module LMB, LMB1, LMB2, LMB3 to the user facility development modules LMEB of the user facility executive sequencer LMAS. The corresponding development module LMEB is called. When the user facility development module function has been processed, then it acknowledges this in the calling user facility module LMB, more precisely the calling sub-controllers R1, R2, R3.

The following user facility development modules LMEB are provided in the illustrated exemplary embodiment:

Call of the exchange-side functions for influencing the call control;

Local data bank functions such as, for example, activation parameters of the user facility activation or the transformation of the address of the call controller ARS when the appertaining user facility indicator is known;

Opening user facilities LM and user facility calls, particularly setting up address information in the data bank DB as well as creating memory area for user facility instances;

The event administration, particularly setting or erasing requested events in the local database DB and the communication of the request to the switching system VS;

Timer functions.

Given forwarding of this function to other components or to the switching system VS, the address information of the sender, usually a sub-controller R1, R2, R3, is attached to the call in order to be able to allocate the acknowledgment of the call to the corresponding sender.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A communication system having a user facility system for realization of user facilities and having a switching system for setting up and clearing down connections between connected subscriber terminal equipment and for reporting switching-oriented events as well as user facility activation and user facility deactivation requests to the user facility system, comprising:

the user facility system having a plurality of user facility modules, having user facility development modules, and having a user facility executive sequencer communicating with the modules, whereby the user facility modules can call user facility development modules made available by the user facility executive sequencer, whereby messages from the user facility executive sequencer about switching-oriented events occurring in the switching system, facility activation and user facility deactivation messages as well as data input by subscriber terminal equipment are respectively communicated to a specific user facility module, signaling messages for the subscriber terminal equipment being communicated from the user facility modules to the switching system;

the user facility executive sequencer receiving a user facility activation request and in response thereto communicating a user facility activation message to a specific user facility module allocated to said activation request; and each user facility module having a plurality of sub-controllers respectively controlling a message-dependent sub-execution, having at least one coordination controller that receives messages from the user facility executive sequencer and forwards said messages to the sub-controllers respectively allocated to said messages, and having a call controller for calling said at least one coordination controller dependent on an incoming user facility activation message.

2. The communication system according to claim 1, wherein the communication system further comprises means for acquiring respectively required sub-controllers by the coordination controller.

3. The communication system according to claim 1, wherein the user facility system is structured such that, dependent on an arriving user facility activation message, a coordination controller is called by the call controller.

4. The communication system according to claim 1, wherein the user facility executive sequencer is informed by the user facility modules about the presence of said user facility modules upon indication of an address information.

5. The communication system according to claim 4, wherein the user facility system is structured such that the information about the presence of a user facility module is respectively communicated from the call controller thereof to the user facility executive sequencer.

6. The communication system according to claim 1, wherein the user facility system is structured such that the coordination controller, after being called by the call controller upon indication of an address information, communicates a message about the accomplished call to the user facility executive sequencer.

7. The communication system according to claim 1, wherein a plurality of dependent sub-user facilities is allocated to a user facility and wherein the user facility system is structured such that the coordination controller, after a call by the call controller, communicates callability of said sub-user facilities to the user facility executive sequencer upon specification of an address of said coordination controller.

8. The communication system according to claim 1, wherein the user facility system is structured such that the user facility executive sequencer, dependent on a user facility deactivation request, communicates a user facility deactivation message to the specific user facility modules allocated to the deactivation request; and wherein at least one user facility module has a deactivation selection controller that, dependent on an incoming user facility deactivation message, determines the coordination controller that is affected by this user facility deactivation message and that is to be addressed.

9. The communication system according to claim 8, wherein the user facility system is structured such that the deactivation selection controller, upon arrival of a deactivation message, interrogates parameters required for specifying the coordination controller to be deactivated and, dependent on said parameters, determines the address of the coordination controller to be selected.

10. The communication system according to claim 9, wherein the user facility system is structured such that the deactivation selection controller interrogates said parameters from components initiating a deactivation call.

11. The communication system according to claim 1, wherein the user facility executive sequencer, in addition to having the user facility development modules, has a message distributor in order to communicate messages incoming from the switching system about the switching-oriented events occurring in the switching system as well as user facility activation and user facility deactivation messages to the user facility modules.

12. The communication system according to claim 1, wherein the user facility executive sequencer has a user facility correlation controller for checking allowability of user facility activation and user facility calls upon activation and call.

13. The communication system according to claim 12, wherein at every incoming event message, the user facility correlation controller determines a user facility module to which said event message is to be delivered.

14. The communication system according to claim 1, wherein the user facility executive sequencer has a central data base with event tables for activated as well as called user facility modules, user facility activation data and user facility module addresses and coordination controller addresses to be addressed by the user facility executive sequencer.

15. A communication system having a user facility system for realization of user facilities and having a switching system for setting up and clearing down connections between connected subscriber terminal equipment and for reporting switching-oriented events as well as user facility activation and user facility deactivation requests to the user facility system, comprising:

the user facility system having a plurality of user facility modules, having user facility development modules, and having a user facility executive sequencer communicating with the modules, whereby the user facility modules can call user facility development modules made available by the user facility executive sequencer, whereby messages from the user facility executive sequencer about switching-oriented events occurring in the switching system, facility activation and user facility deactivation messages as well as data input by subscriber terminal equipment are respectively communicated to a specific user facility module, signaling messages for the subscriber terminal equipment being communicated from the user facility modules to the switching system;

the user facility executive sequencer receiving a user facility activation request and in response thereto communicating a user facility activation message to a specific user facility module allocated to said activation request;

each user facility module having a plurality of sub-controllers respectively controlling a message-dependent sub-execution, having at least one coordination controller that receives messages from the user facility executive sequencer and forwards said messages to the sub-controllers respectively allocated to said messages, and having a call controller for calling said at least one coordination controller dependent on an incoming user facility activation message;

the user facility system being structured such that the user facility executive sequencer, dependent on a user facility deactivation request, communicates a user facility deactivation message to user facility modules allocated to the deactivation request; and at least one user facility module having a deactivation selection controller that, dependent on an incoming user facility deactivation message, determines the coordination controller that is affected by this user facility deactivation message and that is to be addressed.

16. The communication system according to claim 15, wherein the user facility system is structured such that the deactivation selection controller, upon arrival of a deactivation message, interrogates parameters required for specifying the coordination controller to be deactivated and, dependent on said parameters, determines the address of the coordination controller to be selected.

17. The communication system according to claim 16, wherein the user facility system is structured such that the deactivation selection controller interrogates said parameters from components initiating a deactivation call.

18. A communication system having a user facility system for realization of user facilities and having a switching system for setting up and clearing down connections between connected subscriber terminal equipment and for reporting switching-oriented events as well as user facility activation and user facility deactivation requests to the user facility system, comprising:

the user facility system having a plurality of user facility modules, having user facility development modules, and having a user facility executive sequencer communicating with the modules, whereby the user facility modules can call user facility development modules made available by the user facility executive sequencer, whereby messages from the user facility executive sequencer about switching-oriented events occurring in the switching system, facility activation and user facility deactivation messages as well as data input by subscriber terminal equipment are respectively communicated to a specific user facility module, signaling messages for the subscriber terminal equipment being communicated from the user facility modules to the switching system;

the user facility executive sequencer receiving a user facility activation request and in response thereto communicating a user facility activation message to a specific user facility module allocated to said activation request;

each user facility module having a plurality of sub-controllers respectively controlling a message-dependent sub-execution, having at least one coordination controller that receives messages from the user facility executive sequencer and forwards said messages to the sub-controllers respectively allocated to said messages, and having a call controller for calling said at least one coordination controller dependent on an incoming user facility activation message;

the user facility executive sequencer also having a message distributor in order to communicate messages incoming from the switching system about the switching-oriented events occurring in the switching system as well as user facility activation and user facility deactivation messages to the user facility modules; and the user facility executive sequencer having a user facility correlation controller for checking allowability of user facility activation and user facility calls upon activation and call.

19. The communication system according to claim 18, wherein at every incoming event message, the user facility correlation controller determines a user facility module to which said event message is to be delivered.

20. The communication system according to claim 18, wherein the user facility executive sequencer has a central data base with event tables for activated as well as called user facility modules, user facility activation data and user facility module addresses and coordination controller addresses to be addressed by the user facility executive sequencer.

* * * * *